(12) United States Patent
Aldana

(10) Patent No.: US 9,075,125 B2
(45) Date of Patent: Jul. 7, 2015

(54) METHODS AND SYSTEMS FOR POSITIONING BASED ON OBSERVED DIFFERENCE OF TIME OF ARRIVAL

(71) Applicant: QUALCOMM Incorporated, San Diego, CA (US)

(72) Inventor: Carlos H. Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/082,087

(22) Filed: Nov. 15, 2013

(65) Prior Publication Data

US 2014/0200026 A1  Jul. 17, 2014

Related U.S. Application Data

(60) Provisional application No. 61/752,925, filed on Jan. 15, 2013.

(51) Int. Cl.
| | | |
|---|---|---|
| *H04W 24/00* | (2009.01) | |
| *G01S 5/10* | (2006.01) | |
| *G01S 5/02* | (2010.01) | |
| *H04W 64/00* | (2009.01) | |
| *H04W 4/02* | (2009.01) | |

(52) U.S. Cl.
CPC .. *G01S 5/10* (2013.01); *H04W 4/02* (2013.01); *G01S 5/0205* (2013.01); *H04W 64/00* (2013.01)

(58) Field of Classification Search
CPC ........... G01S 5/10; G01S 5/0205; G01S 5/14; G01S 5/0036; G01S 5/021; H04W 64/00; H04W 4/02; H04W 4/20; H04W 4/022; H04W 4/023; H04W 4/027

USPC ............ 455/456.1, 456.3, 456.2, 456.5, 411, 455/440, 404.2

See application file for complete search history.

(56) References Cited

U.S. PATENT DOCUMENTS

| | | | | |
|---|---|---|---|---|
| 3,863,257 | A | * | 1/1975 | Kang et al. ..................... 342/458 |
| 5,629,707 | A | * | 5/1997 | Heuvel et al. ............... 342/357.2 |
| 5,970,413 | A | * | 10/1999 | Gilhousen .................. 455/456.3 |
| 6,975,618 | B1 | | 12/2005 | Smith et al. |
| 7,039,433 | B2 | | 5/2006 | Rantalainen et al. |
| 8,331,953 | B2 | | 12/2012 | Carlson et al. |

(Continued)

FOREIGN PATENT DOCUMENTS

| | | |
|---|---|---|
| WO | WO-2007101211 A2 | 9/2007 |
| WO | WO-2008134223 | 11/2008 |

OTHER PUBLICATIONS

International Search Report—PCT/US2014/011178—ISA/EPO—Jul. 23, 2014.

*Primary Examiner* — Khai M Nguyen
(74) *Attorney, Agent, or Firm* — Berkeley Law & Technology Group, LLP

(57) ABSTRACT

Disclosed are systems, methods and devices for computing an estimated location of a mobile device based, at least in part, on an observed difference of time of arrival of messages arriving at the mobile device. In particular implementations, such observed time arrival may comprise a difference between receipt at the mobile device a first message transmitted from a first transceiver device to a second transceiver device and receipt at the mobile device of a second message transmitted by the second transceiver device in response to the first message.

51 Claims, 9 Drawing Sheets

(56) References Cited

U.S. PATENT DOCUMENTS

| | | |
|---|---|---|
| 2001/0022558 A1* | 9/2001 | Karr et al. .................... 342/450 |
| 2008/0248741 A1* | 10/2008 | Alizadeh-Shabdiz ....... 455/3.02 |
| 2010/0240396 A1* | 9/2010 | Zhang et al. ............... 455/456.1 |
| 2012/0032855 A1 | 2/2012 | Reede et al. |
| 2013/0005347 A1* | 1/2013 | Curticapean ............... 455/456.1 |
| 2014/0051460 A1* | 2/2014 | Dua et al. ................... 455/456.1 |
| 2014/0302869 A1* | 10/2014 | Rosenbaum et al. ...... 455/456.1 |

* cited by examiner

METHODS AND SYSTEMS FOR POSITIONING BASED ON OBSERVED DIFFERENCE OF TIME OF ARRIVAL

This patent application claims benefit of and priority to co-pending U.S. Provisional Patent Application No. 61/752,925, filed Jan. 15, 2013, entitled, "Methods and Systems for Positioning Based on Observed Difference of Time of Arrival", and which is assigned to the assignee hereof and, incorporated herein by reference in its entirety.

BRIEF DESCRIPTION

1. Field

Embodiments described herein are directed to obtaining measurements of signals acquired from a mobile transmitter.

2. Information

Global navigation satellite systems (GNSSs), such as the global positioning system (GPS) and other like satellite positioning systems have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the request message.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
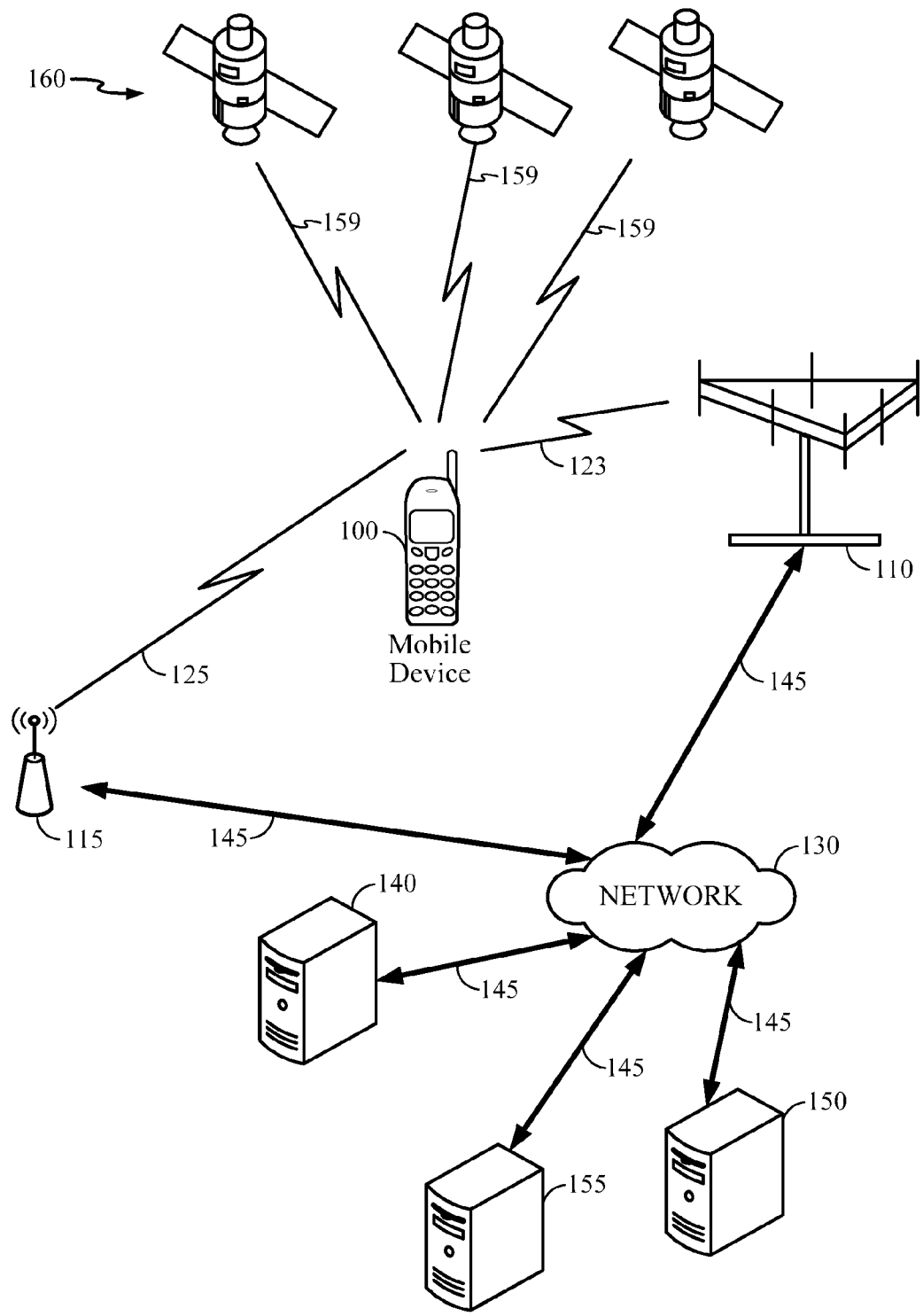
FIG. 1 is a system diagram illustrating certain features of a system containing a mobile device, in accordance with an implementation.

Briefly, particular implementations are directed to a method comprising, at a computing device: obtaining parameters of a first expression including a difference between a time of receiving at a mobile device a first message transmitted by a first access transceiver and a time of receiving a second message at the mobile device transmitted by a second access transceiver, the second message being transmitted by the second access transceiver in response to receipt of the first message at the second access transceiver; obtaining parameters of a second expression including a difference between a time of receiving at the mobile device a third message transmitted by a third access transceiver and a time of receiving a fourth message at the mobile device transmitted by a fourth access transceiver, the fourth message being transmitted by the fourth access transceiver in response to receipt of the third message at the fourth access transceiver; and computing an estimated location of the mobile device based, at least in part, on the first and second expressions.

Another particular implementation is directed to a computing device comprising: one or more processors to: obtain parameters of a first expression including a difference between a time of receiving at a mobile device a first message transmitted by a first access transceiver and a time of receiving a second message at the mobile device transmitted by a second access transceiver, the second message being transmitted by the second access transceiver in response to receipt of the first message at the second access transceiver; obtain parameters of a second expression including a difference between a time of receiving at the mobile device a third message transmitted by a third access transceiver and a time of receiving a fourth message at the mobile device transmitted by a fourth access transceiver, the fourth message being transmitted by the fourth access transceiver in response to receipt of the third message at the fourth access transceiver; and compute an estimated location of the mobile device based, at least in part, on the first and second expressions.

Another particular implementation is directed to article comprising: a non-transitory storage medium comprising machine-readable instructions stored thereon which are executable by a special purpose computing apparatus to: obtain parameters of a first expression including a difference between a time of receiving at a mobile device a first message transmitted by a first access transceiver and a time of receiving a second message at the mobile device transmitted by a second access transceiver, the second message being transmitted by the second access transceiver in response to receipt of the first message at the second access transceiver; obtain parameters of a second expression including a difference between a time of receiving at the mobile device a third message transmitted by a third access transceiver and a time of receiving a fourth message at the mobile device transmitted by a fourth access transceiver, the fourth message being transmitted by the fourth access transceiver in response to receipt of the third message at the fourth access transceiver; and compute an estimated location of the mobile device based, at least in part, on the first and second expressions.

Another particular implementation is directed to an apparatus comprising: means for obtaining parameters of a first expression including a difference between a time of receiving at a mobile device a first message transmitted by a first access transceiver and a time of receiving a second message at the mobile device transmitted by a second access transceiver, the second message being transmitted by the second access transceiver in response to receipt of the first message at the second access transceiver; means for obtaining parameters of a second expression including a difference between a time of receiving at the mobile device a third message transmitted by a third access transceiver and a time of receiving a fourth message at the mobile device transmitted by a fourth access transceiver, the fourth message being transmitted by the fourth access transceiver in response to receipt of the third message at the fourth access transceiver; and means for computing an estimated location of the mobile device based, at least in part, on the first and second expressions.

Another particular implementation is directed to a method at a mobile device comprising: measuring a first difference between a time of receiving at the mobile device a first message transmitted by a first access transceiver and a time of receiving a second message at the mobile device transmitted by a second access transceiver, the second message being transmitted by the second access transceiver in response to receipt of the first message at the second access transceiver; measuring a second difference between a time of receiving at the mobile device a third message transmitted by a third access transceiver and a time of receiving a fourth message at the mobile device transmitted by a fourth access transceiver, the fourth message being transmitted by the fourth access transceiver in response to receipt of the third message at the fourth access transceiver; transmitting the first and second differences to a network entity through a communications network; and receiving an estimated location of the mobile device through the communications network computed based, at least in part, on the transmitted first and second differences.

Another particular implementation is directed to a mobile device comprising: a transceiver device to transmit and receive messages from a communication network; and one or more processors to: measure a first difference between a time of receiving at the transceiver device a first message transmitted by a first access transceiver and a time of receiving a second message at the transceiver device transmitted by a second access transceiver, the second message being transmitted by the second access transceiver in response to receipt of the first message at the second access transceiver; measure a second difference between a time of receiving at the transceiver device a third message transmitted by a third access transceiver and a time of receiving a fourth message at the transceiver device transmitted by a fourth access transceiver, the fourth message being transmitted by the fourth access transceiver in response to receipt of the third message at the fourth access transceiver; initiate transmission of the first and second differences to a network entity through the transceiver device; and obtain an estimated location of the mobile device in one or more messages received at the transceiver device computed based, at least in part, on the transmitted first and second differences.

Another particular implementation is directed to article comprising: a non-transitory storage medium comprising machine-readable instructions stored thereon, which are executable by a special purpose computing apparatus of a mobile device to: measure a first difference between a time of receiving at the mobile device a first message transmitted by a first access transceiver and a time of receiving a second message at the mobile device transmitted by a second access transceiver, the second message being transmitted by the second access transceiver in response to receipt of the first message at the second access transceiver; measure a second difference between a time of receiving at the mobile device a third message transmitted by a third access transceiver and a time of receiving a fourth message at the mobile device transmitted by a fourth access transceiver, the fourth message being transmitted by the fourth access transceiver in response to receipt of the third message at the fourth access transceiver; initiate transmission of the first and second differences to a network entity through a communication network; and obtain an estimated location of the mobile device in one or more messages received from the network entity computed based, at least in part, on the transmitted first and second differences.

Another particular implementation is directed to a mobile device comprising: means for measuring a first difference between a time of receiving at the mobile device a first message transmitted by a first access transceiver and a time of receiving a second message at the mobile device transmitted by a second access transceiver, the second message being transmitted by the second access transceiver in response to receipt of the first message at the second access transceiver; means for measuring a second difference between a time of receiving at the mobile device a third message transmitted by a third access transceiver and a time of receiving a fourth message at the mobile device transmitted by a fourth access transceiver, the fourth message being transmitted by the fourth access transceiver in response to receipt of the third message at the fourth access transceiver; means for transmitting the first and second differences to a network entity through a communications network; and means for receiving an estimated location of the mobile device through the communications network computed based, at least in part, on the transmitted first and second differences.

It should be understood that the aforementioned implementations are merely example implementations, and that claimed subject matter is not necessarily limited to any particular aspect of these example implementations.

DETAILED DESCRIPTION

In particular indoor navigation applications, a mobile device may attempt to measure its range to multiple access points by transmitting a probe message, receiving a response message from a service access transceiver in response to the probe message and measuring the round-trip time (RTT). In environments that are densely populated with client mobile devices, this technique may overburden local network resources with servicing probe messages from multiple mobile devices attempting positioning operations.

As discussed below, messages transmitted between service access transceivers (e.g., IEEE std. 802.11x access points) observed by a mobile device may be used for computing an estimated location of the mobile device. For example, a mobile device may receive messages transmitted between service access transceivers attempting to measure RTT for use in computing or updating estimates of a range between the service access transceivers. Based, at least in part, on times of receipt at the mobile device of messages transmitted between service access transceivers, the mobile device may compute an estimate of its location. In alternative implementations, times of receipt of such messages transmitted between the service access transceivers may be forwarded to a server or other network entity for computation of an estimated location of the mobile device.

In certain implementations, as shown in FIG. 1, a mobile device 100 may receive or acquire satellite positioning system (SPS) signals 159 from SPS satellites 160. In some embodiments, SPS satellites 160 may be from one global navigation satellite system (GNSS), such as the GPS or Galileo satellite systems. In other embodiments, the SPS Satellites may be from multiple GNSS such as, but not limited to, GPS, Galileo, Glonass, or Beidou (Compass) satellite systems. In other embodiments, SPS satellites may be from any one several regional navigation satellite systems (RNSS') such as, for example, Wide Area Augmentation System (WAAS), European Geostationary Navigation Overlay Service (EGNOS), Quasi-Zenith Satellite System (QZSS), just to name a few examples.

In addition, mobile device 100 may transmit radio signals to, and receive radio signals from, a wireless communication network. In one example, mobile device 100 may communicate with a cellular communication network by transmitting wireless signals to, or receiving wireless signals from, base station transceiver 110 over wireless communication link 123. Similarly, mobile device 100 may transmit wireless signals to, or receive wireless signals from local service access transceiver 115 over wireless communication link 125.

In a particular implementation, local service access transceiver 115 may be configured to communicate with mobile device 100 at a shorter range over wireless communication link 125 than at a range enabled by base station transceiver 110 over wireless communication link 123. For example, local service access transceiver 115 may be positioned in an indoor environment. Local service access transceiver 115 may provide access to a wireless local area network (WLAN, e.g., IEEE Std. 802.11 network) or wireless personal area network (WPAN, e.g., Bluetooth network). In another example implementation, local service access transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, base station transceiver 110 and local service access transceiver 115 may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between mobile device 100 and servers 140, 150 or 155 through local service access transceiver 115 or base station transceiver 110. In another implementation, network 130 may comprise cellular communication network infrastructure such as, for example, a base station controller or master switching center (not shown) to facilitate mobile cellular communication with mobile device 100.

In other implementations, mobile device 100 may obtain a position fix by processing signals received from terrestrial transmitters fixed at known locations (e.g., such as base station transceiver 110) using any one of several techniques such as, for example, advanced forward trilateration (AFLT) and/or observed time difference of arrival (OTDOA). In these particular techniques, a range from mobile device 100 may be measured to three or more of such terrestrial transmitters fixed at known locations based, at least in part, on pilot signals transmitted by the transmitters fixed at known locations and received at mobile device 100. Here, servers 140, 150 or 155 may be capable of providing positioning assistance data to mobile device 100 including, for example, locations and identities of terrestrial transmitters to facilitate positioning techniques such as AFLT and OTDOA. For example, servers 140, 150 or 155 may include a base station almanac (BSA) which indicates locations and identities of cellular base stations in a particular region or regions.

In particular environments such as indoor environments or urban canyons, mobile device 100 may not be capable of acquiring signals 159 from a sufficient number of SPS satellites 160 or perform AFLT or OTDOA to compute a position fix. Alternatively, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC address from signals received from such access points and obtaining range measurements to the access points by measuring one or more characteristics of signals received from such access points such as, for example, received signal strength (RSSI) or round trip time (RTT). In alternative implementations, mobile device 100 may obtain an indoor position fix by applying characteristics of acquired signals to a radio heatmap indicating expected RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected RSSI or RTT. It should be understood, however, that these are merely examples of values that may be stored in a radio heatmap, and that claimed subject matter is not limited in this respect.

In particular implementations, mobile device 100 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples. Other assistance data received by the mobile device may include, for example, local maps of indoor areas for display or to aid in navigation. Such a map may be provided to mobile device 100 as mobile device 100 enters a particular indoor area. Such a map may show indoor features such as doors, hallways, entry ways, walls, etc., points of interest such as bathrooms, pay phones, room names, stores, etc. By obtaining and displaying such a map, a mobile device may overlay a current location of the mobile device (and user) over the displayed map to provide the user with additional context.

In a particular implementation, particular messages flows between wireless stations (STAs) may be implemented for obtaining a measurement of RTT between the STAs for use in positioning operations as discussed above. In particular implementations, as described below, any STA may comprise a mobile device (e.g., mobile device 100) or a stationary transceiver (e.g., IEEE std. 802.11x access point, stationary Bluetooth device, etc.). As such, an exchange of messages between wireless STAs may comprise an exchange of messages between a mobile device and a stationary transceiver, between two peer mobile devices, or between two stationary transceivers, just to provide a few examples. In particular implementations, various techniques described herein may incorporate some, but not necessarily all, aspects or features of IEEE Standard 802.11 for Information technology—Telecommunications and information exchange between systems, Local and metropolitan area networks—Specific requirements Part 11: Wireless LAN Medium Access Control (MAC) and Physical Layer (PHY), Feb. 6, 2012 (hereinafter "IEEE std. 802.11 specification"), section 10.23.5. Indeed, it should be understood that some features described herein are not shown or described in the IEEE std. 802.11 specification.

Figure 2:
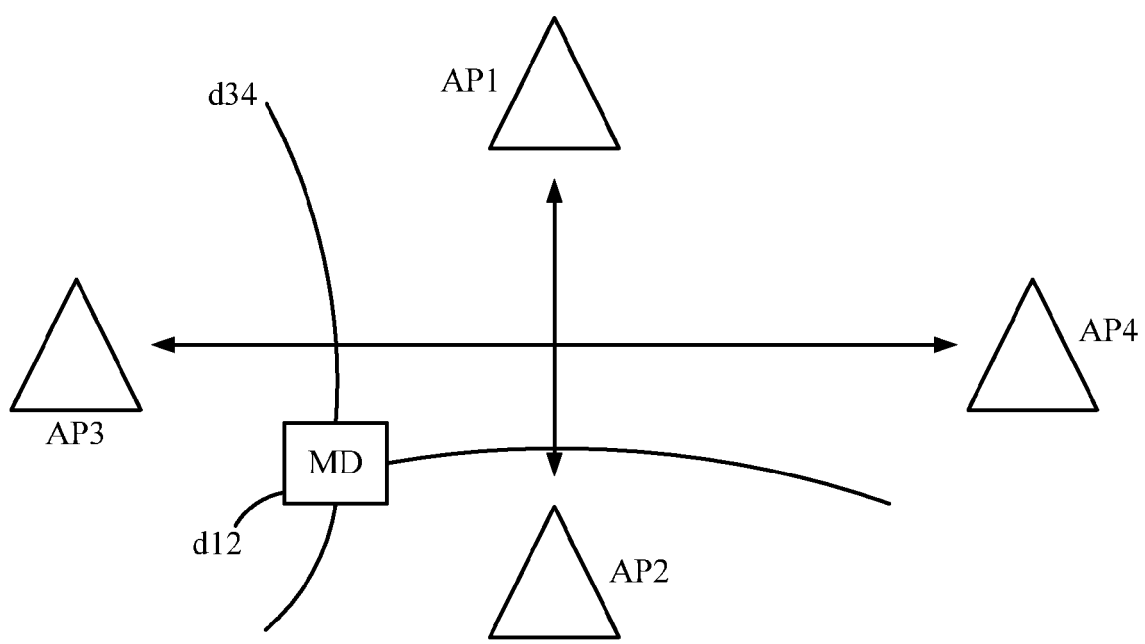
FIG. 2 is a diagram graphically illustrating computation of an estimate of a mobile device according to an embodiment.

FIG. 2 is a diagram graphically illustrating computation of an estimate of a mobile device according to an embodiment. Service access transceivers AP1, AP2, AP3 and AP4 may be positioned in an indoor navigation area for example and may be capable of transmitting and receiving messages according a known communication protocol. Here, mobile device MD may observe messages transmitted between service access transceivers AP1 and AP2, and messages transmitted between service access transceivers AP3 and AP4 as discussed above. Based, at least in part, on observations of these messages at mobile device MD, an estimate of location of mobile device MD may be computed.

Figure 3:
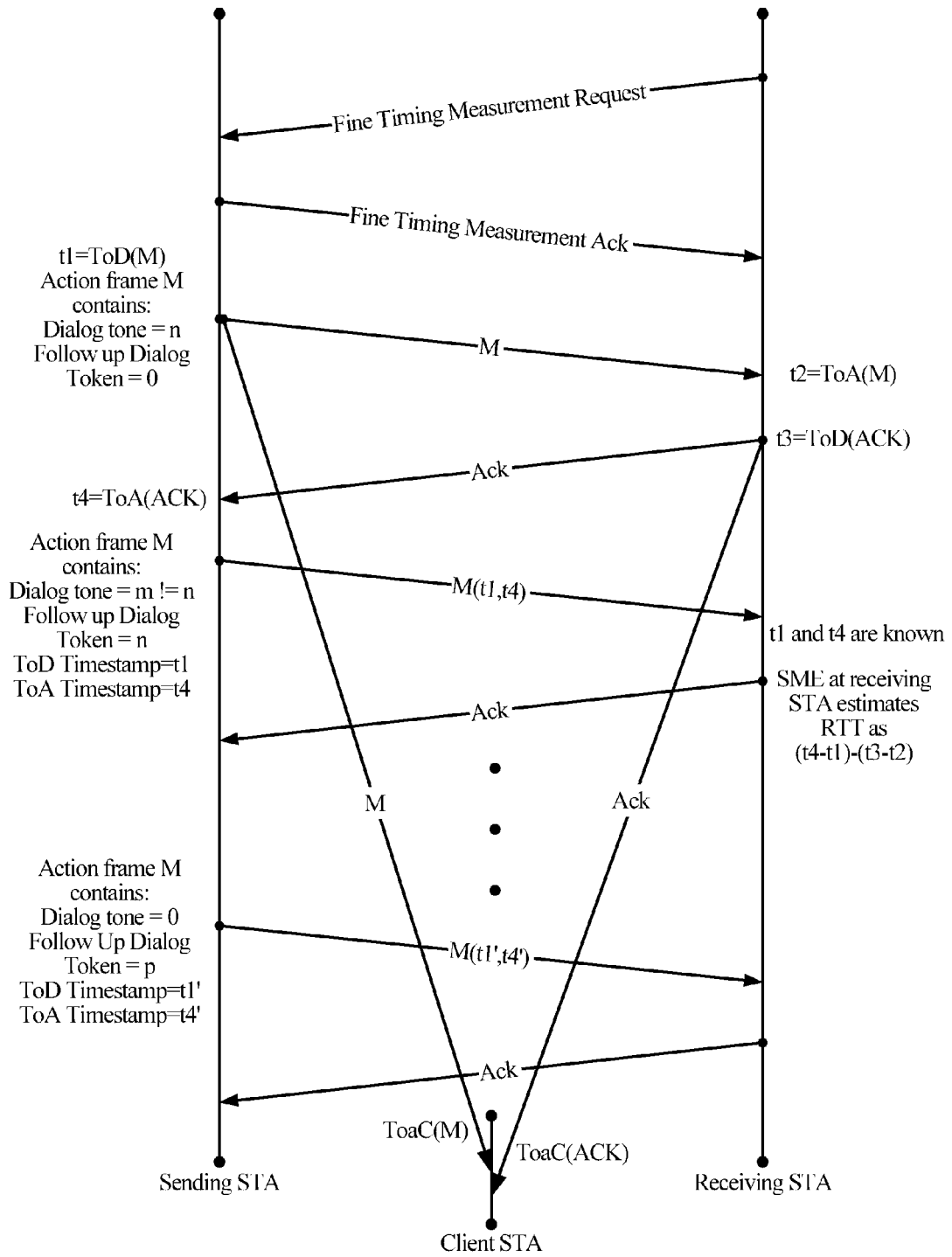
FIG. 3 is a diagram illustrating a message flow between wireless stations (STAs) according to an embodiment.

FIG. 3 is a diagram illustrating a message flow between wireless STAs according to an embodiment of FIG. 2 in which mobile device MD is represented as a client STA and pair of service access transceivers AP1 and AP2 may be represented as sending STA and receiving STA, respectively. Similarly, pair of service access transceivers AP3 and AP4 may be represented as sending STA and receiving STA, respectively. At a time ToaC(M) client STA may receive a fine timing request message transmitted by the sending STA (e.g., service access transceivers AP1 and AP3) at time t1. At a time ToaC(ACK) client STA may receive an acknowledgement message transmitted by the receiving STA (e.g., service access transceivers AP2 and AP4) at a time t3 in response to receipt of the fine timing request message. In a particular implementation, a fine timing request message transmitted by the sending STA and an acknowledgement message transmitted by the receiving STA may be transmitted according to the IEEE Std. 802.11 specification at sections 8.5.25 and 8.5.26. If sending STA and receiving STA represent AP1 and AP2, respectively, a plot d12 may represent possible locations of mobile device MD determined based, at least in part, on ToaC(M)−ToaC(ACK). Similarly, if sending STA and receiving STA represent AP3 and AP4, respectively, a plot d34 may represent possible locations of mobile device MD determined based, at least in part, on ToaC(M)−ToaC(ACK). A computed intersection of plots d12 and d34 may then provide an estimated location of mobile device MD.

In a particular implementation, a location of mobile device MD may be computed at a central network entity or "cloud" (e.g., servers 140, 150 or 155). FIGS. 4A, 4B, 5A and 5B illustrate alternative processes for determining parameters of expressions for computing a location of mobile device MD according to particular embodiments of FIG. 2. In a particular implementation, any one of these expressions may be used to define plot d12 or d34 for use in computing an estimated location of mobile device MD. As explained below in a particular implementation, measurements obtained at a mobile device and at sending and receiving STAs may be computed at a network entity such as a computing device in a network (e.g., a network entity in a network 202, 204, 206 or 208).

Figure 4A:
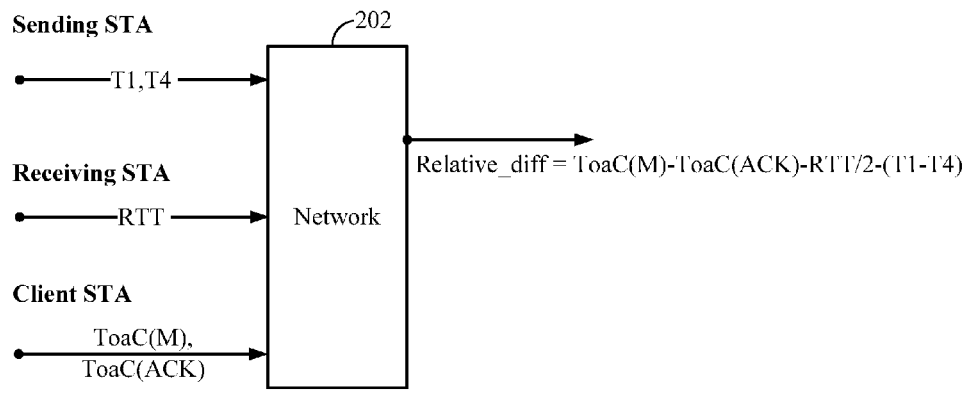
FIGS. 4A, 4B, 5A and 5B illustrate alternate processes for determining parameters of expressions for computing an estimated location of a mobile device according to an embodiment.

FIG. 4A shows collection at network 202 of parameters t1 (time of transmission of a fine timing request message from sending STA) and t4 (time of receipt at the sending STA of an acknowledgment message transmitted in response to the fine timing request message) received from sending STA, a signal RTT measurement from receiving STA (computed based on transmission of a fine timing request message from the receiving STA, and transmission of an acknowledgement message at sending STA in response to receipt of the fine timing request message), and ToaC(M) (time of receipt at the client STA of the fine timing request message transmitted from the sending STA) and ToaC(ACK) (time of receipt at the client STA of the acknowledgment message transmitted by the receiving STA in response to receipt of the fine timing request message) from client STA to determine an expression (1) as follows:

$$\text{Relative\_diff} = ToaC(M) - ToaC(ACK) - RTT/2 - (t1-t4) \qquad (1)$$

In an alternative implementation, a value for t1−t4 may be computed at a sending STA and transmitted to a network entity for determining expression Relative_diff according to expression (1).

Figure 4B:
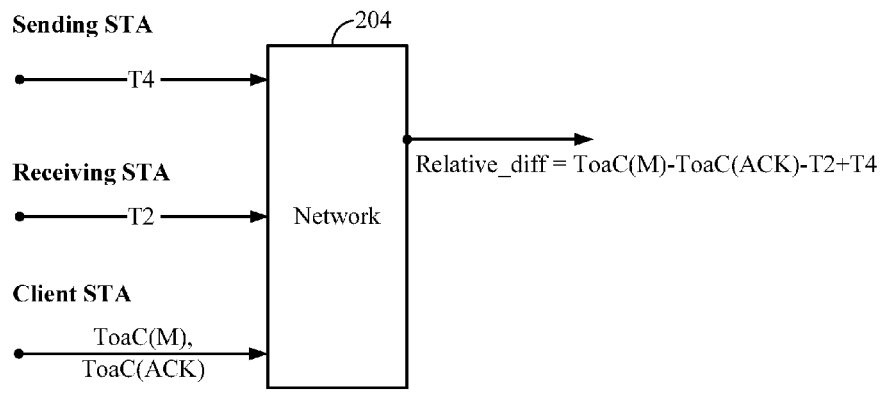

FIG. 4B shows collection at network 204 of parameters t2 (time of receiving a fine timing request message at receiving STA) and t4 from sending STA, and ToaC(M) and ToaC (ACK) from client STA to determine an expression (2) as follows:

$$\text{Relative\_diff} = ToaC(M) - ToaC(ACK) - t2 + t4 \qquad (2)$$

Figure 5A:
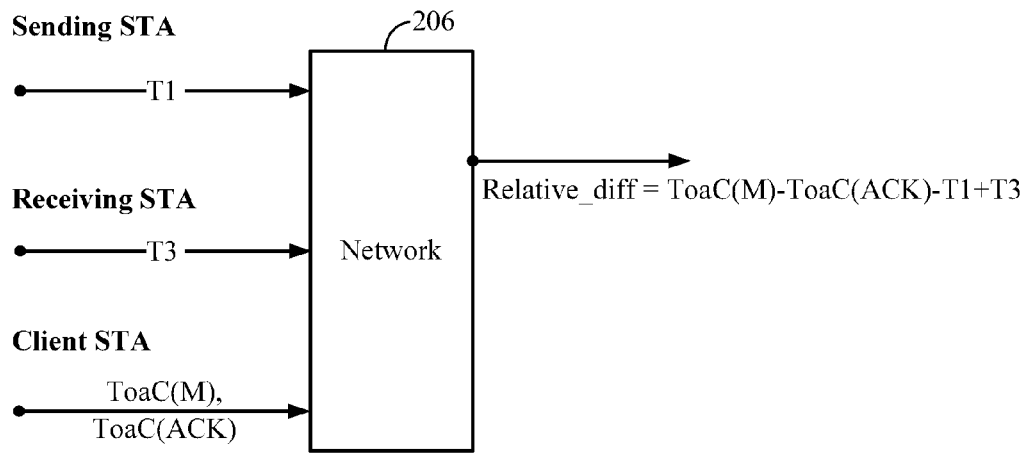

FIG. 5A shows collection at network 206 of parameters t1 from sending STA, t3 (time of transmitting an acknowledgment message from receiving STA to sending STA in response to a fine timing request message) from receiving STA, and ToaC(M) and ToaC(ACK) from client STA to determine an expression (3) as follows:

$$\text{Relative\_diff} = ToaC(M) - ToaC(ACK) - t1 + t3 \qquad (3)$$

Figure 5B:
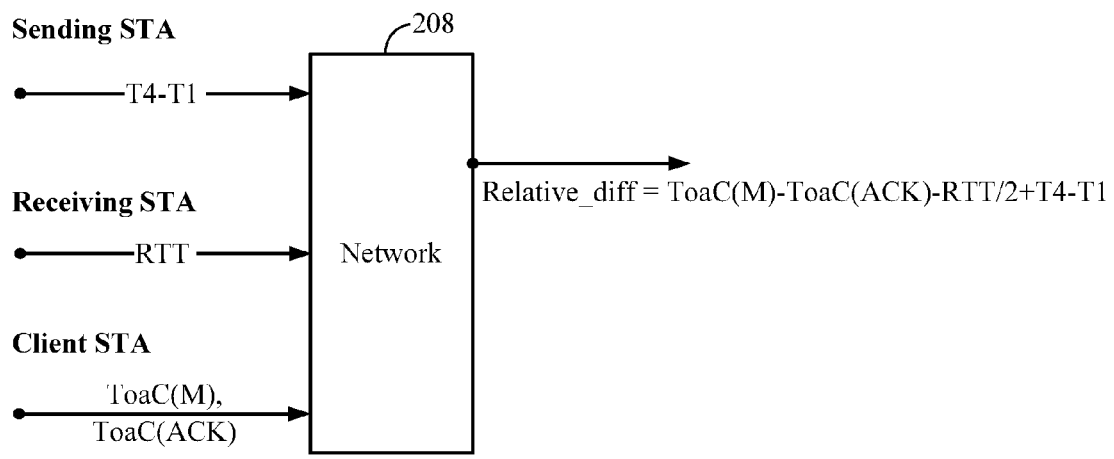

FIG. 5B shows a collection at network 208 of parameters t4−t1 received from sending STA, RTT received from receiving STA, and ToaC(M) and ToaC(ACK) from client STA to determine an expression (4) as follows:

$$\text{Relative\_diff} = ToaC(M) - ToaC(ACK) - RTT/2 + t4 + t1 \qquad (4)$$

It may be observed that the particular implementations of FIGS. 4A and 5B to determine Relative_diff according to expressions (1) and (4) do not require synchronization between sending and receiving STAs. In these particular implementations, differences between parameters t1 and t4, which are measured at the sending STA, may remove a measurement bias.

The specific implementations of FIGS. 4A, 4B, 5A and 5B are shown as computing or obtaining a difference ToaC(M)−ToaC(ACK). To provide such differences from two or pairs of access points as described above in FIG. 2, a network entity may compute a first relative difference based on values ToaC (M) and ToaC(ACK) for an exchange of messages from a first pair of access points (e.g., AP1 and AP2) and a second relative difference based on values ToaC(M) and ToaC(ACK) for an exchange of messages from a second pair of access points (e.g., AP3 and AP4). In other implementations, the two different pairs of access points are not necessarily mutually exclusive. For example, a first such pair may comprise AP1 and AP2, and a second such pair may comprise AP2 and AP3. In another implementation, access points among the pairs of access points exchanging messages may be non-collinear.

FIGS. 4A, 4B, 5A and 5B show that separate measurements ToaC(M) and ToaC(ACK) are provided by client STA. In alternative implementations, client STA may compute a value for ToaC(M)−ToaC(ACK) based, at least in part, on measurements ToaC(M) and ToaC(ACK), and forward the computed value for ToaC(M)−ToaC(ACK) to the network entity for computing an estimated location of the client STA.

Figure 6A:
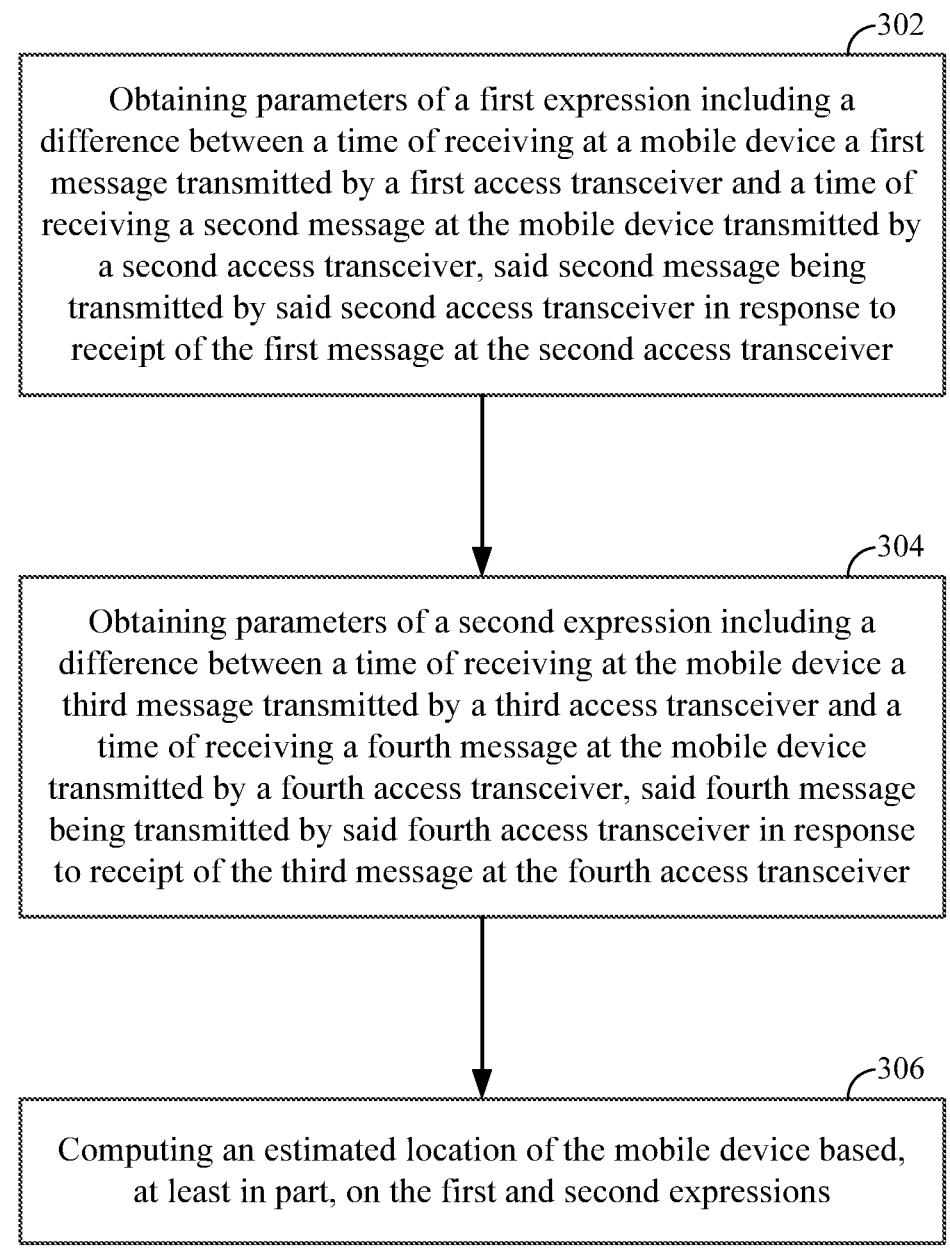
FIG. 6A is a flow diagram of a process for computing an estimated location of a mobile device according to an embodiment.

FIG. 6A is a flow diagram of a process to compute an estimated location of a mobile device. Such a process may be computed, for example, by a network entity (e.g., server 140, 150 or 155) according to blocks 302, 304, 306 or 308 using one or more of expressions (1), (2), (3) or (4) for a Relative_diff expression. Here, in a particular implementation, blocks 302 and 304 may each obtain parameters of an expression a different pair of access transceivers (e.g., sending and receiving STA pairs). For a first pair of access transceivers, block 302 may obtain parameters of a first expression including a difference between a time of receiving a first message at a mobile device (e.g., ToaC(M))) and a time of receiving a second message at the mobile device (e.g., ToaC(ACK)). In particular implementations, other parameters may be obtained for determining the first expression (e.g., depending on the form of the expression as, for example, with the particular example expressions (1), (2), (3) or (4)). For a second pair of access transceivers, block 304 may obtain similar parameters. Using the parameters obtained at blocks 302 and 304 for the first and second expressions, block 306 may compute an estimated location of the mobile device. For example, block 306 may compute the estimated location of the mobile device to be consistent with an intersection of plots based on the first and second expressions as discussed above.

In a particular implementation, pairs of access transceivers at blocks 302 and 304 may comprise sending and receiving STAs as illustrated in FIG. 3. For example, a sending STA in a first pair of access transceivers may transmit a first message (transmitted by a first access transceiver) and a receiving STA in the first pair of access transceivers may transmit a second message in response (transmitted by a second access transceiver). Similarly a second pair of access transceivers may transmit a third message (transmitted by a third access transceiver) and a receiving STA in the second first pair of access transceivers may transmit a second message in response (transmitted by a fourth access transceiver). First, second, third and fourth messages may be received at a client STA as shown in FIG. 3.

Figure 6B:
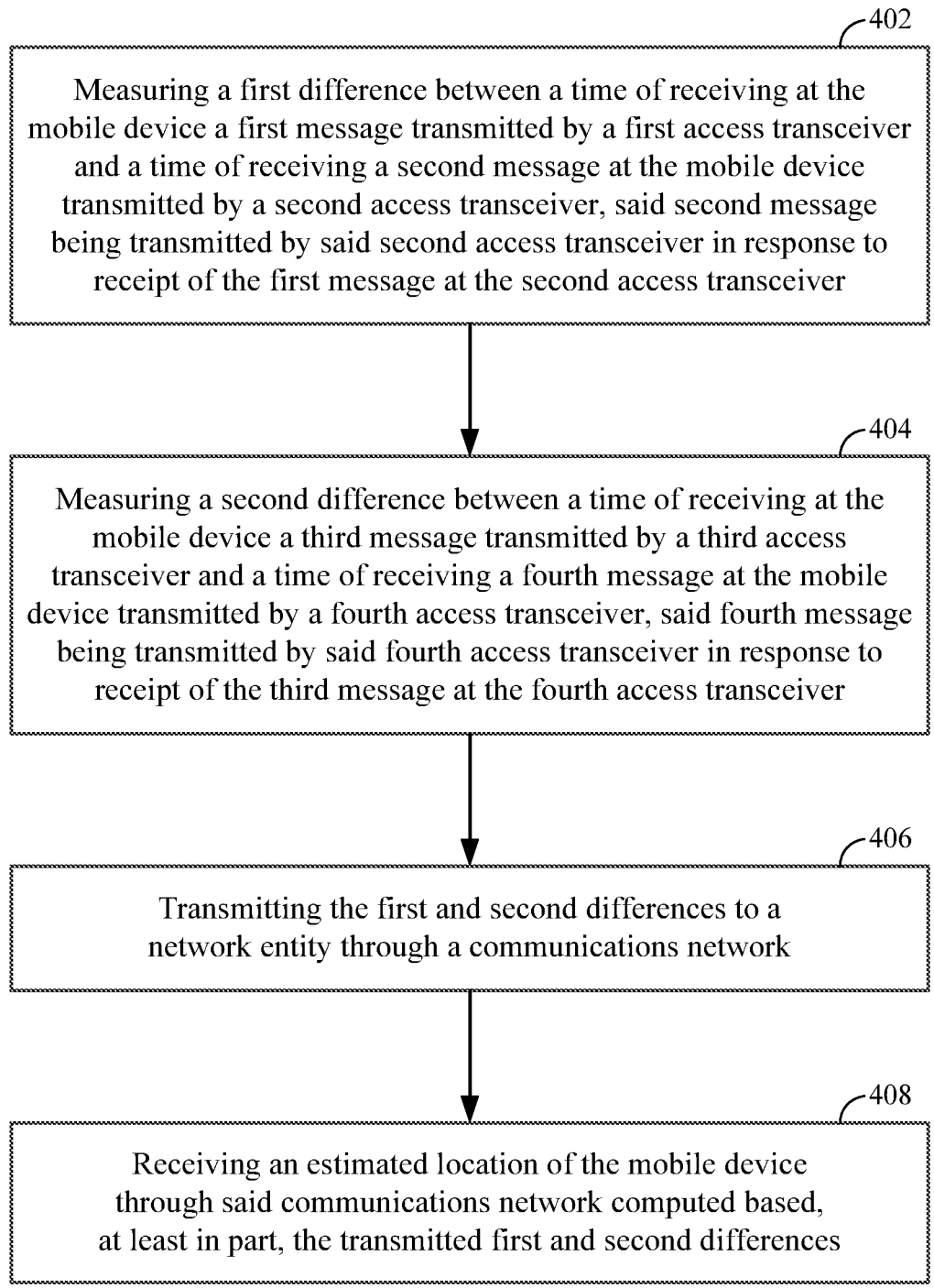
FIG. 6B is a flow diagram of a process performed at a mobile device for obtaining an estimate of its location according to an embodiment.

In a particular implementation, an estimated location of a mobile device computed at block 306 may be transmitted back to the mobile device for use in one or more applications, for example. FIG. 6B is a flow diagram of a process performed at a mobile device to obtain an estimate of its location. In a particular implementation, at block 402, for example, the mobile device may measure times of receipt of a first fine timing measurement request message transmitted by a first access transceiver and receipt of an acknowledgement message transmitted by a second access transceiver in response to the first fine timing measurement request message to obtain a first difference (e.g., ToaC(M)–ToaC(ACK)). At block 404, for example, the mobile device may measure times of receipt of a second fine timing measurement request message transmitted by a third access transceiver and receipt of an acknowledgement message transmitted by a fourth access transceiver in response to the second fine timing measurement request message to obtain a second difference. The mobile device may then transmit the first and second differences at block 406 through a communication network on a network entity, and then receive a computed estimate of a location of the mobile device at block 408.

In alternative implementations, instead of measuring differences at blocks 402 and 404, a mobile device may obtain and forward times of receipt of the first and second fine timing request messages (e.g., ToaC(M)) and times of receipt of acknowledgment messages transmitted in response to the first and second timing request messages (e.g., ToaC(ACK)).

In a particular implementation, pairs of access transceivers at blocks 402 and 404 may comprise sending and receiving STAs as illustrated in FIG. 3. For example, a sending STA in a first pair of access transceivers may transmit a first message (transmitted by a first access transceiver) and a receiving STA in the first pair of access transceivers may transmit a second message in response (transmitted by a second access transceiver). Similarly a second pair of access transceivers may transmit a third message (transmitted by a third access transceiver) and a receiving STA in the second first pair of access transceivers may transmit a second message in response (transmitted by a fourth access transceiver). First, second, third and fourth messages may be received at a client STA as shown in FIG. 3. The client STA may obtain measured differences set forth at blocks 402 and 404, transit the measured differences to a network entity such as server, and then receive an estimated location of the client STA at block 408.

Figure 7:
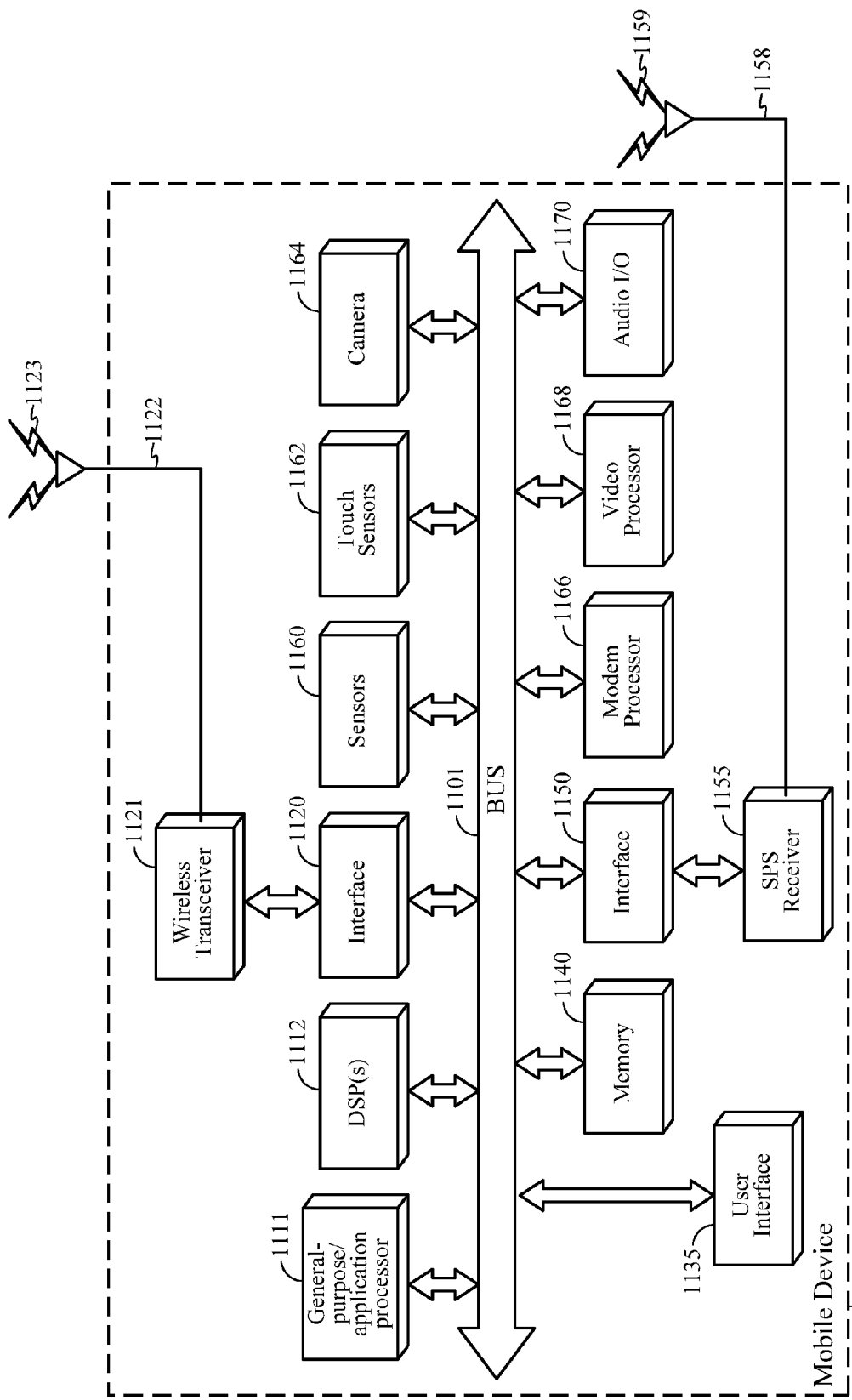
FIG. 7 is a schematic block diagram illustrating an exemplary device, in accordance with an implementation.

FIG. 7 is a schematic diagram of a mobile device according to an embodiment. Mobile device 100 (FIG. 1) may comprise one or more features of mobile device 1100 shown in FIG. 7. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth, just to name a few examples. In one implementation, mobile device 1100 may comprise a client STA for obtaining measurements of ToaC (M) or ToaC(ACK) for use in computing an estimated location of mobile device 1100. In a particular implementation, all or portions of blocks 406 and/or 408 may be performed by wireless transceiver 1121.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 7, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, general-purpose processor(s) 1111, specialized processor, or DSP(s) 1112 may perform actions at blocks 302, 304 or 306, or at blocks 402 and/or 404 as shown in FIG. 6B.

Also shown in FIG. 7, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

In a particular implementation, mobile device 1000 may be capable of performing one or more of the actions set forth in the process of FIG. 6B. For example, DPS(s) or general purpose application processor 1111 may perform all or a portion of actions at blocks 402 or 404. Wireless transceiver 1121 may perform all or portion of actions at blocks 406 or 408.

Figure 8:
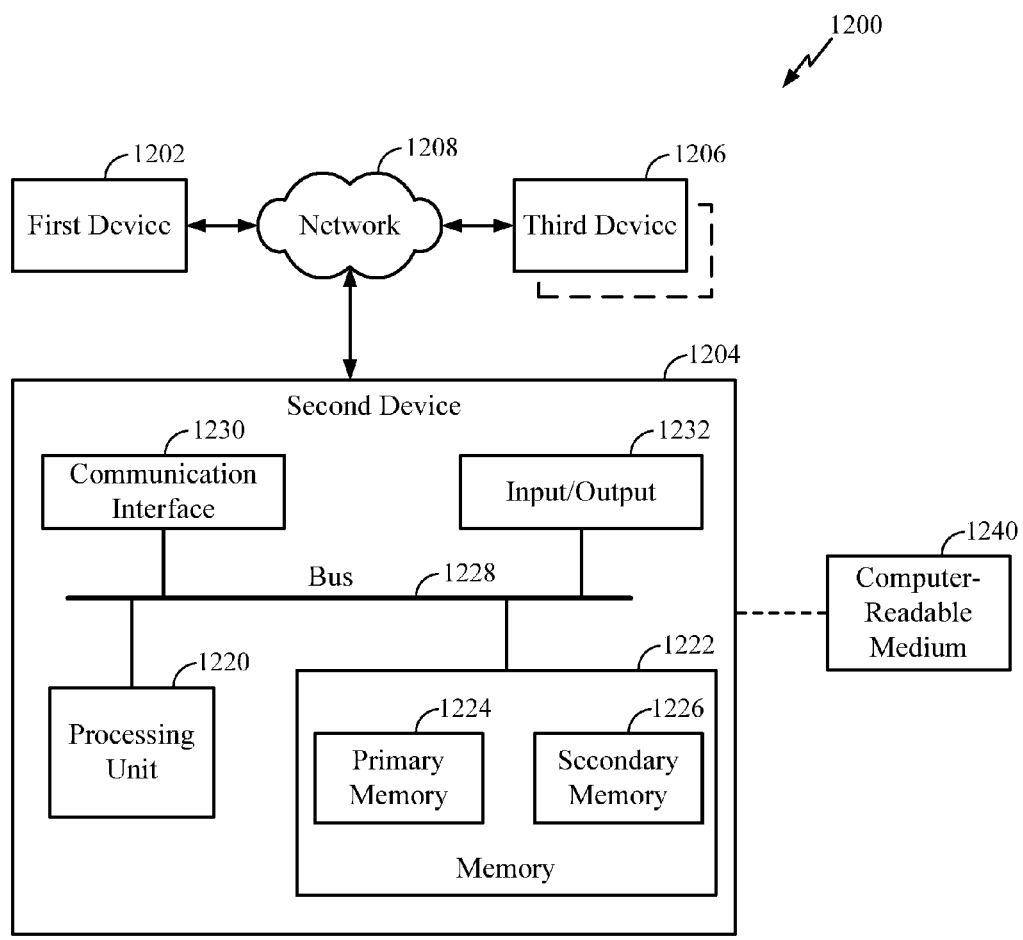
FIG. 8 is a schematic block diagram of an example computing platform in accordance with an implementation.

FIG. 8 is a schematic diagram illustrating an example system 1200 that may include one or more devices configurable to implement techniques or processes described above, for example, in connection with FIG. 1. System 1200 may include, for example, a first device 1202, a second device 1204, and a third device 1206, which may be operatively coupled together through a wireless communications network 1208. In an aspect, first device 1202 may comprise a server capable of providing positioning assistance data such as, for example, a base station almanac. Second and third devices 1204 and 1206 may comprise mobile devices, in an aspect. Also, in an aspect, wireless communications network 1208 may comprise one or more wireless access points, for example. However, claimed subject matter is not limited in scope in these respects.

First device 1202, second device 1204 and third device 1206, as shown in FIG. 8, may be representative of any device, appliance or machine (e.g., such as local service access transceiver 115 or servers 140, 150 or 155 as shown in FIG. 1) that may be configurable to exchange data over wireless communications network 1208. By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a base station almanac server, a base station, or a mobile device in accordance with the examples described herein.

Similarly, communications network 1208 (e.g., in a particular of implementation of network 130 shown in FIG. 1), may be representative of one or more communication links, processes, or resources configurable to support the exchange of data between at least two of first device 1202, second device 1204, and third device 1206. By way of example but not limitation, communications network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1206, there may be additional like devices operatively coupled to wireless communications network 1208.

It is recognized that all or part of the various devices and networks shown in system 1200, and the processes and methods as further described herein, may be implemented using or otherwise including hardware, firmware, software, or any combination thereof.

Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220.

In particular implementation, second device 1204 may be capable of performing actions at blocks 302, 304 and 306 for computing an estimated location of a mobile device. For example, second device 1204 may receive parameters in messages receiving from a client STA, receiving STA and/or sending STA through communication network 1208 for use in forming one or more of expressions (1), (2), (3) or (4) for use in computing an estimated location of the client STA.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory medium that can carry or make accessible data, code or instructions for one or more of the devices in system 1200. Computer-readable medium 1240 may also be referred to as a storage medium.

Second device 1204 may include, for example, a communication interface 1030 that provides for or otherwise supports the operative coupling of second device 1204 to at least wireless communications network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a computing device:
    obtaining parameters of a first expression including a difference between a time of receiving at a mobile device a first message transmitted by a first access transceiver and a time of receiving a second message at the mobile device transmitted by a second access transceiver, said second message being transmitted by said second access transceiver in response to receipt of the first message at the second access transceiver;
    obtaining parameters of a second expression including a difference between a time of receiving at the mobile device a third message transmitted by a third access transceiver and a time of receiving a fourth message at the mobile device transmitted by a fourth access transceiver, said fourth message being transmitted by said fourth access transceiver in response to receipt of the third message at the fourth access transceiver; and
    computing an estimated location of the mobile device based, at least in part, on the first and second expressions.

2. The method of claim 1, wherein computing the estimated location of the mobile device comprises determining an intersection of plots defined by said first and second expressions.

3. The method of claim 1, wherein said first and second expressions define plots of hyperbolas.

4. The method of claim 1, and wherein the parameters of the first expression further comprise:
    a measurement of a round-trip signal time for transmission of the first message and receipt of the second message at the first access transceiver.

5. The method of claim 4, and wherein the parameters of the first expression further comprise:
    a time of transmission of the first message; and
    a time of receipt of the second message at the first access transceiver.

6. The method of claim 4, wherein the first expression comprises:

$$ToaC(M)-ToaC(ACK)-RTT/2+t4+t1, \text{ wherein:}$$

ToaC(M)−ToaC(ACK) is the difference between the time of receiving at the mobile device the first message and the time of receiving the second message at the mobile device;
RTT is the measurement of the round-trip signal time;
t1 is a time of transmission of the first message; and
t4 is a time of receipt of the second message at the first access transceiver.

7. The method of claim 4, and wherein the parameters of the first expression further comprise a difference between a time of transmission of the first message and a time of receipt of the second message at the first access transceiver, and wherein the first expression comprises:

$$ToaC(M)-ToaC(ACK)-RTT/2-(t1-t4), \text{ wherein:}$$

ToaC(M)−ToaC(ACK) is the difference between the time of receiving at the mobile device the first message and the time of receiving the second message at the mobile device;
RTT is the measurement of the round-trip signal time; and
t1−t4 is the difference between the time of transmission of the first message and the time of receipt of the second message at the first access transceiver.

8. The method of claim 1, and wherein the parameters of the first expression further comprise:
    a time of receipt of the first message at the second access transceiver; and
    a time of receipt of the second message at the first access transceiver.

9. The method of claim 8, wherein the first expression comprises:

$$ToaC(M)-ToaC(ACK)-t2+t4, \text{ wherein:}$$

ToaC(M)−ToaC(ACK) is the difference between the time of receiving at the mobile device the first message and the time of receiving the second message at the mobile device;
t2 is the time of receipt of the first message at the second access transceiver; and
t4 is the time of receipt of the second message at the first access transceiver.

10. The method of claim 1, and wherein the parameters of the first expression further comprise:
    a time of transmission of the first message; and
    a time of transmission of the second message.

11. The method of claim 10, and wherein the first expression comprises:

$$ToaC(M)-ToaC(ACK)-t1+t3, \text{ wherein:}$$

ToaC(M)−ToaC(ACK) is the difference between the time of receiving at the mobile device the first message and the time of receiving the second message at the mobile device;
t2 is the time of transmission of the first message; and
t3 is the time of transmission of the second message.

12. The method of claim 1, where the first message comprises a fine timing request message transmitted according to IEEE std. 802.11 and the second message comprises an acknowledgement message transmitted according to the IEEE std. 802.11.

13. A computing device comprising:
one or more processors to:
obtain parameters of a first expression including a difference between a time of receiving at a mobile device a first message transmitted by a first access transceiver and a time of receiving a second message at the mobile device transmitted by a second access transceiver, said second message being transmitted by said second access transceiver in response to receipt of the first message at the second access transceiver;
obtain parameters of a second expression including a difference between a time of receiving at the mobile device a third message transmitted by a third access transceiver and a time of receiving a fourth message at the mobile device transmitted by a fourth access transceiver, said fourth message being transmitted by said fourth access transceiver in response to receipt of the third message at the fourth access transceiver; and
compute an estimated location of the mobile device based, at least in part, on the first and second expressions.

14. The computing device of claim 13, and wherein the parameters of the first expression further comprise:
a measurement of a round-trip signal time for transmission of the first message and receipt of the second message at the first access transceiver.

15. The computing device of claim 14, and wherein the parameters of the first expression further comprise:
a time of transmission of the first message; and
a time of receipt of the second message at the first access transceiver.

16. The computing device of claim 14, wherein the first expression comprises:

$ToaC(M)-ToaC(ACK)-RTT/2+t4+t1$, wherein:

ToaC(M)−ToaC(ACK) is the difference between the time of receiving at the mobile device the first message and the time of receiving the second message at the mobile device;
RTT is the measurement of the round-trip signal time;
t1 is a time of transmission of the first message; and
t4 is a time of receipt of the second message at the first access transceiver.

17. The computing device of claim 14, and wherein the parameters of the first expression further comprise a difference between a time of transmission of the first message and a time of receipt of the second message at the first access transceiver, and wherein the first expression comprises:

$ToaC(M)-ToaC(ACK)-RTT/2-(t1-t4)$, wherein:

ToaC(M)−ToaC(ACK) is the difference between the time of receiving at the mobile device the first message and the time of receiving the second message at the mobile device;
RTT is the measurement of the round-trip signal time; and
t1−t4 is the difference between the time of transmission of the first message and the time of receipt of the second message at the first access transceiver.

18. The computing device of claim 13, and wherein the parameters of the first expression further comprise:
a time of receipt of the first message at the second access transceiver; and
a time of receipt of the second message at the first access transceiver.

19. The computing device of claim 18, wherein the first expression comprises:

$ToaC(M)-ToaC(ACK)-t2+t4$, wherein:

ToaC(M)−ToaC(ACK) is the difference between the time of receiving at the mobile device the first message and the time of receiving the second message at the mobile device;
t2 is the time of receipt of the first message at the second access transceiver; and
t4 is the time of receipt of the second message at the first access transceiver.

20. The computing device of claim 13, and wherein the parameters of the first expression further comprise:
a time of transmission of the first message; and
a time of transmission of the second message.

21. The computing device of claim 20, and wherein the first expression comprises:

$ToaC(M)-ToaC(ACK)-t1+t3$, wherein:

ToaC(M)−ToaC(ACK) is the difference between the time of receiving at the mobile device the first message and the time of receiving the second message at the mobile device;
t2 is the time of transmission of the first message; and
t3 is the time of transmission of the second message.

22. An article comprising:
a non-transitory storage medium comprising machine-readable instructions stored thereon which are executable by a special purpose computing apparatus to:
obtain parameters of a first expression including a difference between a time of receiving at a mobile device a first message transmitted by a first access transceiver and a time of receiving a second message at the mobile device transmitted by a second access transceiver, said second message being transmitted by said second access transceiver in response to receipt of the first message at the second access transceiver;
obtain parameters of a second expression including a difference between a time of receiving at the mobile device a third message transmitted by a third access transceiver and a time of receiving a fourth message at the mobile device transmitted by a fourth access transceiver, said fourth message being transmitted by said fourth access transceiver in response to receipt of the third message at the fourth access transceiver; and
compute an estimated location of the mobile device based, at least in part, on the first and second expressions.

23. The article of claim 22, and wherein the parameters of the first expression further comprise:
a measurement of a round-trip signal time for transmission of the first message and receipt of the second message at the first access transceiver.

24. The article of claim 23, and wherein the parameters of the first expression further comprise:
a time of transmission of the first message; and
a time of receipt of the second message at the first access transceiver.

25. The article of claim 23, wherein the first expression comprises:

$ToaC(M)-ToaC(ACK)-RTT/2+t4+t1$, wherein:

ToaC(M)−ToaC(ACK) is the difference between the time of receiving at the mobile device the first message and the time of receiving the second message at the mobile device;
RTT is the measurement of the round-trip signal time;
t1 is a time of transmission of the first message; and
t4 is a time of receipt of the second message at the first access transceiver.

26. The article of claim 23, and wherein the parameters of the first expression further comprise a difference between a time of transmission of the first message and a time of receipt of the second message at the first access transceiver, and wherein the first expression comprises:

$$ToaC(M)-ToaC(ACK)-RTT/2-(t1-t4), \text{ wherein:}$$

ToaC(M)−ToaC(ACK) is the difference between the time of receiving at the mobile device the first message and the time of receiving the second message at the mobile device;
RTT is the measurement of the round-trip signal time; and
t1−t4 is the difference between the time of transmission of the first message and the time of receipt of the second message at the first access transceiver.

27. The article of claim 22, and wherein the parameters of the first expression further comprise:
   a time of receipt of the first message at the second access transceiver; and
   a time of receipt of the second message at the first access transceiver.

28. The article of claim 27, wherein the first expression comprises:

$$ToaC(M)-ToaC(ACK)-t2+t4, \text{ wherein:}$$

ToaC(M)−ToaC(ACK) is the difference between the time of receiving at the mobile device the first message and the time of receiving the second message at the mobile device;
t2 is the time of receipt of the first message at the second access transceiver; and
t4 is the time of receipt of the second message at the first access transceiver.

29. The article of claim 22, and wherein the parameters of the first expression further comprise:
   a time of transmission of the first message; and
   a time of transmission of the second message.

30. The article of claim 29, and wherein the first expression comprises:

$$ToaC(M)-ToaC(ACK)-t1+t3, \text{ wherein:}$$

ToaC(M)−ToaC(ACK) is the difference between the time of receiving at the mobile device the first message and the time of receiving the second message at the mobile device;
t2 is the time of transmission of the first message; and
t3 is the time of transmission of the second message.

31. An apparatus comprising:
   means for obtaining parameters of a first expression including a difference between a time of receiving at a mobile device a first message transmitted by a first access transceiver and a time of receiving a second message at the mobile device transmitted by a second access transceiver, said second message being transmitted by said second access transceiver in response to receipt of the first message at the second access transceiver;
   means for obtaining parameters of a second expression including a difference between a time of receiving at the mobile device a third message transmitted by a third access transceiver and a time of receiving a fourth message at the mobile device transmitted by a fourth access transceiver, said fourth message being transmitted by said fourth access transceiver in response to receipt of the third message at the fourth access transceiver; and
   means for computing an estimated location of the mobile device based, at least in part, on the first and second expressions.

32. A method comprising, at a mobile device:
   measuring a first difference between a time of receiving at the mobile device a first message transmitted by a first access transceiver and a time of receiving a second message at the mobile device transmitted by a second access transceiver, said second message being transmitted by said second access transceiver in response to receipt of the first message at the second access transceiver;
   measuring a second difference between a time of receiving at the mobile device a third message transmitted by a third access transceiver and a time of receiving a fourth message at the mobile device transmitted by a fourth access transceiver, said fourth message being transmitted by said fourth access transceiver in response to receipt of the third message at the fourth access transceiver;
   transmitting the first difference and the second difference to a network entity through a communications network; and
   receiving an estimated location of the mobile device through said communications network computed based, at least in part, on the transmitted first difference and second difference.

33. The method of claim 32, and wherein the estimated location of the mobile device is further computed based, at least in part, on a measurement of a round-trip signal time for transmission of the first message and receipt of the second message at the first access transceiver.

34. The method of claim 33, and wherein the estimated location of the mobile device is further computed based, at least in part, on:
   a time of transmission of the first message; and
   a time of receipt of the second message at the first access transceiver.

35. The method of claim 33, wherein the estimated location of the mobile device is further computed based, at least in part, on:

$$ToaC(M)-ToaC(ACK)-RTT/2+t4+t1, \text{ wherein:}$$

ToaC(M)−ToaC(ACK) is the first difference;
RTT is the measurement of the round-trip signal time;
t1 is a time of transmission of the first message; and
t4 is a time of receipt of the second message at the first access transceiver.

36. The method of claim 33, wherein the estimated location of the mobile device is further computed based, at least in part, on:

$$ToaC(M)-ToaC(ACK)-RTT/2-(t1-t4), \text{ wherein:}$$

ToaC(M)−ToaC(ACK) is the first difference;
RTT is the measurement of the round-trip signal time; and
t1−t4 is the difference between a time of transmission of the first message and the a of receipt of the second message at the first access transceiver.

37. The method of claim 32, and wherein the estimated location of the mobile device is further computed based, at least in part, on:
   a time of receipt of the first message at the second access transceiver; and
   a time of receipt of the second message at the first access transceiver.

38. The method of claim 37, wherein the estimated location of the mobile device is further computed based, at least in part, on:

$$ToaC(M)-ToaC(ACK)-t2+t4, \text{ wherein:}$$

ToaC(M)−ToaC(ACK) is the first difference;
t2 is the time of receipt of the first message at the second access transceiver; and t4 is the time of receipt of the second message at the first access transceiver.

39. The method of claim 32, wherein the estimated location is further computed based, at least in part, on:
   a time of transmission of the first message; and
   a time of transmission of the second message.

40. The method of claim 39, and wherein the estimated location is further computed based, at least in part, on:

$$ToaC(M)-ToaC(ACK)-t1+t3, \text{ wherein:}$$

ToaC(M)−ToaC(ACK) is the first difference;
t2 is the time of transmission of the first message; and
t3 is the time of transmission of the second message.

41. A mobile device comprising:
   a transceiver device to transmit and receive messages from a communication network; and
   one or more processors to:
      measure a first difference between a time of receiving at the transceiver device a first message transmitted by a first access transceiver and a time of receiving a second message at the transceiver device transmitted by a second access transceiver, said second message being transmitted by said second access transceiver in response to receipt of the first message at the second access transceiver;
      measure a second difference between a time of receiving at the transceiver device a third message transmitted by a third access transceiver and a time of receiving a fourth message at the transceiver device transmitted by a fourth access transceiver, said fourth message being transmitted by said fourth access transceiver in response to receipt of the third message at the fourth access transceiver;
      initiate transmission of the first difference and second difference to a network entity through said transceiver device; and
      obtain an estimated location of the mobile device in one or more messages received at said transceiver device computed based, at least in part, on the transmitted first difference and second difference.

42. The mobile device of claim 41, and wherein the estimated location of the mobile device is further computed based, at least in part, on a measurement of a round-trip signal time for transmission of the first message and receipt of the second message at the first access transceiver.

43. The mobile device of claim 42, and wherein the estimated location of the mobile device is further computed based, at least in part, on:
   a time of transmission of the first message; and
   a time of receipt of the second message at the first access transceiver.

44. The mobile device of claim 42, wherein the estimated location of the mobile device is further computed based, at least in part, on:

$$ToaC(M)-ToaC(ACK)-RTT/2+t4+t1, \text{ wherein:}$$

ToaC(M)−ToaC(ACK) is the first difference;
RTT is the measurement of the round-trip signal time;
t1 is a time of transmission of the first message; and
t4 is a time of receipt of the second message at the first access transceiver.

45. The mobile device of claim 42, wherein the estimated location of the mobile device is further computed based, at least in part, on:

$$ToaC(M)-ToaC(ACK)-RTT/2-(t1-t4), \text{ wherein:}$$

ToaC(M)−ToaC(ACK) is the first difference;
RTT is the measurement of the round-trip signal time; and
t1−t4 is the difference between a time of transmission of the first message and a time of receipt of the second message at the first access transceiver.

46. The mobile device of claim 41, and wherein the estimated location of the mobile device is further computed based, at least in part, on:
   a time of receipt of the first message at the second access transceiver; and
   the time of receipt of the second message at the first access transceiver.

47. The mobile device of claim 46, wherein the estimated location of the mobile device is further computed based, at least in part, on:

$$ToaC(M)-ToaC(ACK)-t2+t4, \text{ wherein:}$$

ToaC(M)−ToaC(ACK) is the first difference;
t2 is the time of receipt of the first message at the second access transceiver; and
t4 is the time of receipt of the second message at the first access transceiver.

48. The mobile device of claim 41, and wherein the estimated location is further computed based, at least in part, on:
   a time of transmission of the first message; and
   a time of transmission of the second message.

49. The mobile device of claim 48, and wherein the estimated location is further computed based, at least in part, on:

$$ToaC(M)-ToaC(ACK)-t1+t3, \text{ wherein:}$$

ToaC(M)−ToaC(ACK) is the first difference;
t2 is the time of transmission of the first message; and
t3 is the time of transmission of the second message.

50. An article comprising:
   a non-transitory storage medium comprising machine-readable instructions stored thereon, which are executable by a special purpose computing apparatus of a mobile device to:
      measure a first difference between a time of receiving at the mobile device a first message transmitted by a first access transceiver and a time of receiving a second message at the mobile device transmitted by a second access transceiver, said second message being transmitted by said second access transceiver in response to receipt of the first message at the second access transceiver;
      measure a second difference between a time of receiving at the mobile device a third message transmitted by a third access transceiver and a time of receiving a fourth message at the mobile device transmitted by a fourth access transceiver, said fourth message being transmitted by said fourth access transceiver in response to receipt of the third message at the fourth access transceiver;
      initiate transmission of the first difference and the second difference to a network entity through a communication network; and
      obtain an estimated location of the mobile device in one or more messages received from said network entity computed based, at least in part, on the transmitted first difference and second difference.

51. A mobile device comprising:

means for measuring a first difference between a time of receiving at the mobile device a first message transmitted by a first access transceiver and a time of receiving a second message at the mobile device transmitted by a second access transceiver, said second message being transmitted by said second access transceiver in response to receipt of the first message at the second access transceiver;

means for measuring a second difference between a time of receiving at the mobile device a third message transmitted by a third access transceiver and a time of receiving a fourth message at the mobile device transmitted by a fourth access transceiver, said fourth message being transmitted by said fourth access transceiver in response to receipt of the third message at the fourth access transceiver;

means for transmitting the first difference and the second difference to a network entity through a communications network; and means for receiving an estimated location of the mobile device through said communications network computed based, at least in part, on the transmitted first difference and second difference.

\* \* \* \* \*